(12) United States Patent
Nozu

(10) Patent No.: US 7,454,138 B2
(45) Date of Patent: Nov. 18, 2008

(54) METHOD FOR OPTIMIZING PATH OF OPTICAL NETWORK, AND OPTICAL TRANSMISSION NODE FOR REALIZING PATH OPTIMIZATION

(75) Inventor: Yasuko Nozu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/282,066

(22) Filed: Nov. 17, 2005

(65) Prior Publication Data
US 2006/0067694 A1    Mar. 30, 2006

(51) Int. Cl.
*H04B 10/08* (2006.01)
*H04B 17/00* (2006.01)

(52) U.S. Cl. .............................. 398/25; 398/26; 398/27; 398/28; 398/9; 398/45; 398/75; 398/173; 398/175; 398/177

(58) Field of Classification Search ............. 398/25–29, 398/79–83; 370/237–351, 395.1
See application file for complete search history.

(56) References Cited

U.S. PATENT DOCUMENTS

| | | | |
|---|---|---|---|
| 6,038,044 | A | 3/2000 | Fee et al. |
| 2002/0063915 | A1* | 5/2002 | Levandovsky et al. ...... 359/110 |
| 2003/0016411 | A1* | 1/2003 | Zhou et al. .................. 359/110 |
| 2003/0147645 | A1* | 8/2003 | Imajuku et al. ................ 398/7 |
| 2003/0189933 | A1* | 10/2003 | Ozugur et al. ........... 370/395.1 |
| 2004/0032831 | A1* | 2/2004 | Matthews ................... 370/238 |
| 2004/0264960 | A1* | 12/2004 | Maciocco et al. ............. 398/49 |
| 2005/0105470 | A1* | 5/2005 | Lazzeri et al. ............... 370/237 |

FOREIGN PATENT DOCUMENTS

| | | |
|---|---|---|
| JP | 2002-504776 | 2/2002 |
| JP | 2003-169027 | 6/2003 |
| JP | 2003-229891 | 8/2003 |
| JP | 2003-234823 | 8/2003 |
| WO | WO 99/43115 | 8/1999 |

OTHER PUBLICATIONS

International Search Report dated Jan. 13, 2004.

* cited by examiner

*Primary Examiner*—Kenneth N Vanderpuye
*Assistant Examiner*—Li Liu
(74) *Attorney, Agent, or Firm*—Katten Muchin Rosenman LLP

(57) ABSTRACT

Span information (information about conditions of a path between a node of interest and another, adjacent node connected thereto) retained in respective nodes is cumulatively transmitted from a add-drop node, which is to become a starting-point node of a certain wavelength path, toward a add-drop node, which is to become an end-point node of the wavelength path. The end-point node autonomously determines a path satisfying predetermined transmission conditions as an optimal pathway of said wavelength path, on the basis of cumulative span information transmitted over the respective plural pathways from the starting-point node to the node of interest. As a result, a load imposed on line design to be performed by a client can be mitigated, and an optimization design for each path (wavelength) matching a mesh-type optical network can be performed.

17 Claims, 9 Drawing Sheets

FIG. 3

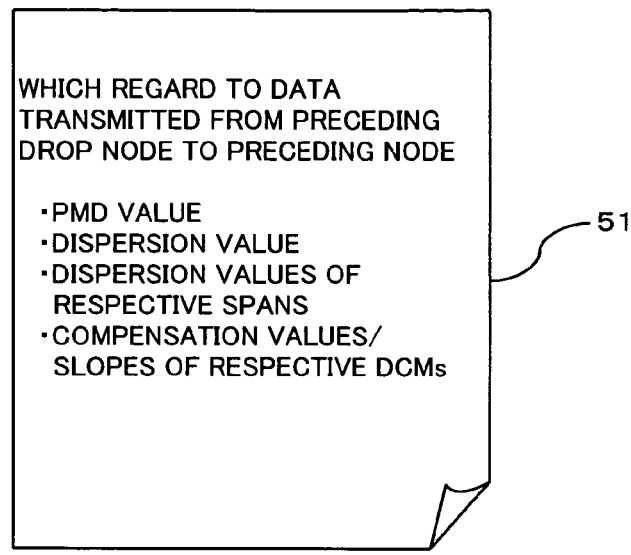

WHICH REGARD TO DATA TRANSMITTED FROM PRECEDING DROP NODE TO PRECEDING NODE

- PMD VALUE
- DISPERSION VALUE
- DISPERSION VALUES OF RESPECTIVE SPANS
- COMPENSATION VALUES/ SLOPES OF RESPECTIVE DCMs

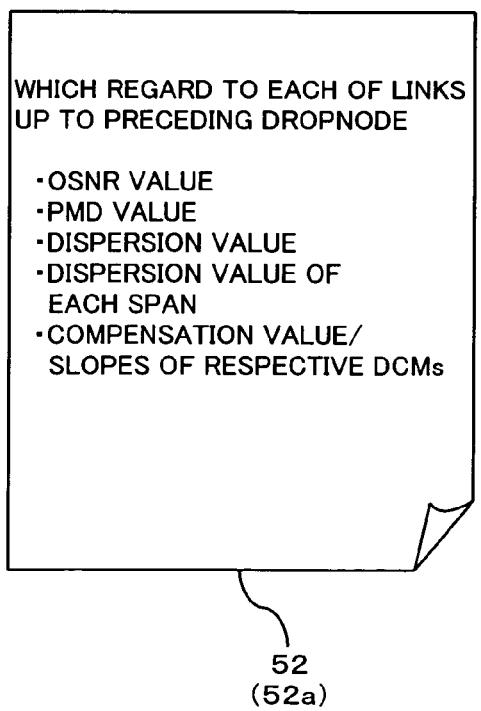

WHICH REGARD TO EACH OF LINKS UP TO PRECEDING DROPNODE

- OSNR VALUE
- PMD VALUE
- DISPERSION VALUE
- DISPERSION VALUE OF EACH SPAN
- COMPENSATION VALUE/ SLOPES OF RESPECTIVE DCMs 52 (52a)

FIG. 4B

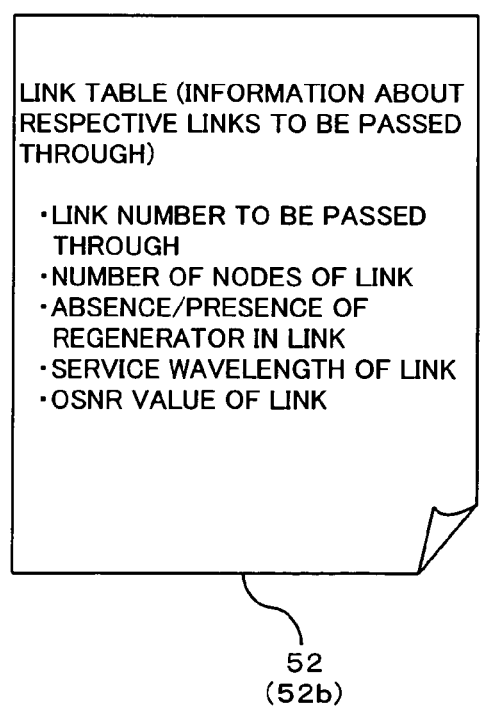

LINK TABLE (INFORMATION ABOUT RESPECTIVE LINKS TO BE PASSED THROUGH)

- LINK NUMBER TO BE PASSED THROUGH
- NUMBER OF NODES OF LINK
- ABSENCE/PRESENCE OF REGENERATOR IN LINK
- SERVICE WAVELENGTH OF LINK
- OSNR VALUE OF LINK 52 (52b)

FIG. 7

| SPAN DATA PERTAINING TO ALL NODES RETAINED BY THEMSELVES | |
|---|---|
| 1 PMD VALUE OF SPAN TO BE RECEIVED (EXAMPLE: SPAN 1 FOR NODE #2) | DATA MEASURED BY NODE OF INTEREST ARE RETAINED |
| 2 DISPERSION VALUE/SLOPE OF SPAN TO BE RECEIVED | DATA MEASURED BY NODE OF INTEREST ARE RETAINE |
| 3 Band-DCM DISPERSION COMPENSATION VALUE OF NODE OF INTEREST | DCM SETTING VALUE OF STATION OF INTEREST IS RETAINED |
| 4 INPUT LEVEL OF SPAN (EXAMPLE: SPAN 1 FOR NODE #2) TO BE RECEIVED | DATA MEASURED BY NODE OF INTEREST ARE RETAINED |
| 5 OUTPUT VALUE OF OPPOSING NODE (EXAMPLE: NODE 1 FOR NODE #2) OF SPAN TO BE RECEIVED | DATA TRANSMITTED FROM OPPOSING STATION BY WAY OF OSC ARE RETAINED |
| 6 SPAN LOSS VALUE OF SPAN TO BE RECEIVED | DATA TRANSMITTED FROM OPPOSING NODE BY WAY OF OSC ARE RETAINED |
| LINK DATA PERTAINING TO AND RETAINED SOLELY BY DROP NODE | |
| 7 OSNR VALUE OF DATA TRANSMITTED FROM PRECEDING NODE TO NODE OF INTEREST (EXAMPLE: LINK 1 FOR NODE #3) | OSNR VALUE FROM 4-6 DATA TRANSMITTED IS COMPUTED FROM RESPECTIVE NODES OF LINK OF INTEREST, AND THE THUS-COMPUTED VALUE IS RETAINED |
| 8 PMD VALUE OF DATA TRANSMITTED FROM PRECEDING DROP NODE TO NODE OF INTEREST | DATA 1 TRANSMITTED FROM RESPECTIVE NODES OF LINK OF INTEREST ARE CUMULATIVELY COMPUTED AND RETAINED |
| 9 DISPERSION VALUES/SLOPES OF DATA TRANSMITTED FROM PRECEDING DROP NODE TO NODE OF INTEREST | 2, 3 DATA TRANSMITTED FROM RESPECTIVE NODES OF LINK OF INTEREST ARE CUMULATIVELY COMPUTED AND RETAINED |
| 10 SERVICE WAVELENGTH OF LINK OF INTEREST | WAVELENGTH FOR WHICH PATH HAS BEEN SET IS RETAINED |
| RESPECTIVE PATH DATA RETAINED SOLELY BY DROP NODE | |
| 11 DISPERSION VALUE/SLOPE OF EACH SERVICE WAVELENGTH OF NODE OF INTEREST | DATA MEASURED BY NODE OF INTEREST ARE RETAINED |
| 12 WAVELENGTH-SPECIFIC DCM DISPERSION COMPENSATION VALUE OF NODE OF INTEREST | DCM SETTING VALUE OF NODE OF INTEREST IS RETAINED |

US 7,454,138 B2

METHOD FOR OPTIMIZING PATH OF OPTICAL NETWORK, AND OPTICAL TRANSMISSION NODE FOR REALIZING PATH OPTIMIZATION

CROSS REFERENCE TO RELATED APPLICATIONS

This application is based on and hereby claims priority to PCT international application No. PCT/JP2003/012398 filed on Sep. 29, 2003 in Japan, the contents of which are hereby incorporated by reference.

BACKGROUND OF THE INVENTION (1) Field of the Invention

The present invention relates to a method for optimizing a path of an optical network and to an optical transmission node for realizing path optimization, and more particularly, to a technique suitable for use in a main optical communication (WDM: Wavelength Division Multiplex) network.

(2) Description of the Related Art

A point-to-point network has become mainstream in a long-haul network. However, in accordance with increasing demand for lines and complication of the lines, there is growing necessity for mesh-type networking, in which importance is placed on a path.

The basic concept of a WDM network design that has become predominant in the field of the related-art network of a point-to-point type is to transmit all wavelengths from a certain node to another node [including add-drop (Add-drop) nodes provided at arbitrary points between the nodes]. To this end, regenerator nodes are disposed so as to maximize a "3R distance of a system" [an electronic regenerative relay (regeneration); namely, a distance over which wavelengths are transmitted without involvement of optical/electrical/optical conversion]. Once the 3R distance of the system and arrangement of the regenerator nodes have been determined, the arrangement of the regenerators is fixed even when a future increase in the number of paths arises, and re-design for additional paths is not required (is impossible).

A design, such as a 3R design (the arrangement of the regenerator nodes) of such a point-to-point-based system and dispersion compensation, or the like, is created on paper (with a tool) in accordance with span data (information about optical fibers between nodes, or the like) provided by the client before start-up of the system.

Specifically, in the design of a conventional WDM network, a necessity for regenerators of respective nodes/lack of such necessity and a dispersion compensation value are determined on the basis of information about an optical fiber of the network (a loss and dispersion in a transmission path) so as to maximize the "3R distance of the system," on paper (with a tool) before installation of the system. As shown in, e.g., FIG. 9, in the conventional predominant point-to-point network, essentially all the paths employ the same starting and end points, and some of the paths are dropped (or added) at nodes provided between the starting point and the end point. Accordingly, in many cases, the number of regenerators (R, see a hatched section in FIG. 9) can be minimized by achieving the longest 3R distance for the system.

However, when the optical network of the overall system is of a mesh type and when the paths have become complicated, the design optimized to the 3R distance of the system involves placement of unwanted regenerators. An example mesh-type optical network is described in Patent Document 1 provided below.

Patent Document 1
JP-T-2002-504776

As shown in FIG. 10, when a mesh network is configured in accordance with the conventional design philosophy for optimizing the network to a 3R distance of a system, the mesh network becomes an aggregation of point-to-point systems (3R systems: refer to arrow 100 drawn in a heavy solid line) optimized to the 3R distance of the system. In FIG. 10, reference numerals 101 to 107 designate optical transmission nodes (hereinafter called "drop nodes"), each of which has the function of adding/dropping a WDM signal; 200 designates an optical relay node; 300 designates a wavelength multiplexing separation section; 400 designates a regenerator (R) (an O/E/O converter); and 500 designates a cross-connect section. Each of the drop nodes 101 to 107 is formed from a combination of one wavelength-multiplexing separation section 300, one regenerator 400, and one cross-connect section 500, the nodes being equal in number to input/output channels (WDM channels).

In this case, a path (b) set from the drop node 101 to the drop node 105 runs through a 3R system 100 which connects together the drop node 100 and the drop node 102. After having been temporarily terminated at the drop node 102 (where a regenerator has been arranged), the path is added to/dropped off from any position in the 3R system 100 that connects the drop node 103 and the drop node 105.

This configuration is adopted even when the distance (transmission path) from the drop node 101 to the drop node 105 may enable transmission without an electronic regenerative relay embodied by the regenerator 400. Since the design (dispersion compensation or the like) has been created so as to optimize the 3R distance of each system, transmission from the drop node 101 to the drop node 105 cannot be guaranteed.

In order to solve the problem, design that optimizes a 3R distance of each path (wavelength) rather than the 3R distance of the system is to be achieved. However, a plan for increasing the number of paths (wavelengths) or a path drop plan is not necessarily determined in a period of early design. For this reason, the conventional design technique, such as dispersion compensation or the like, optimized to the initially-fixed 3R system, fails to facilitate an optimum design in terms of future addition of paths.

When, at the beginning of an on-paper design, an attempt is made to create a design so as to optimize a 3R distance of a path, the number of regenerators can be curtailed as compared to that required for a design of the 3R distance of the system (i.e., only a design is made on a per-system basis in an early stage, and a re-design/re-setting is not required at the time of addition of paths). However, there is an increase in effort required to effect optimization design on a per-path basis from the period of initial setting and effort required to make a reset in response to increased paths.

Moreover, in the case of the mesh-type network, a method for selecting (determining) a path from a starting point to an end point also presents a challenge. Specifically, the shortest distance does not necessarily become optimum in terms of cost. Depending on conditions for a transmission path (a poor-quality optical fiber or the like), a regenerator can be required in view of performance requirements other than a distance. Therefore, in order to determine an optimal path, the number of regenerators provided in a path or the number of wavelengths used over the path must be taken into account.

Moreover, as a general problem of WDM, design of a WDM line itself poses heavy load on a client. Namely, in order to cause a WDM apparatus to exhibit its maximum performance, a channel design based on information about rigorous measurement of a transmission path (an optical fiber) is indispensable. However, in many cases, rigorous measurement information is not available at the time of planning for laying a line or purchasing equipment. Design and purchase of equipment are performed on the basis of rough data. Measurement or re-design of a transmission path is carried out before start-up of the apparatus. For these reasons, duplicative efforts are required for a design. In the worst case, a re-design will also require changes in articles.

The present invention has been conceived in view of the above-described drawbacks and aims at enabling design of a path so as to optimize not a 3R distance of a system but a 3R distance of a wavelength path, by means of enabling an optical network to autonomously transmit information about conditions for a transmission path between nodes, to thus select (determine) an optimal pathway (e.g., a pathway involving a minimum number of regenerators, or the like) to which a wavelength path is to be set.

SUMMARY OF THE INVENTION

In order to achieve the above-described object, the present invention provides a path-optimizing method for use with an optical network formed by mutually connecting a plurality of optical transmission nodes for transmitting a wavelength multiplexed optical signal to a plurality of add-drop nodes for effecting add-drop processing of the wavelength multiplexed optical signal, wherein (a) the optical transmission nodes and the add-drop nodes retain, as span information, information about conditions of transmission paths between other, adjacent nodes connected to the optical transmission nodes and the add-drop nodes;

(b) the span information retained in each of the nodes is cumulatively transmitted from a add-drop node, which is to be a starting-point node of a certain wavelength path, to another add-drop node which is to be an end-point node of the wavelength path; and (c) the end-point node autonomously determines a pathway satisfying predetermined transmission conditions as a pathway optimal for the wavelength path on the basis of cumulative span information which is transmitted in connection with a plurality of pathways from the starting-point node to the end-point node.

Here, each of the add-drop nodes preferably acquires information about transmission path conditions of an optical link from another add-drop node to the add-drop node on the basis of the cumulative span information transmitted from adjacent nodes connected to the add-drop node, and retains the information as link information; the link information retained by each of the add-drop nodes is preferably cumulatively transmitted from the starting-point node to the end-point node; and the end-point node preferably determines a combination of optical links, which satisfy predetermined transmission conditions, from the starting-point node to the end point node as a pathway optimal for the wavelength path, on the basis of link information retained by the end-point node and cumulative link information transmitted from a plurality of adjacent nodes connected to the end-point node.

Moreover, each of the add-drop nodes may determine whether or not an electric regenerative relay is required, on the basis of link information retained by the add-drop node and the cumulative link information from the adjacent nodes, and cumulatively transmit a result of determination to the end-point node along with the link information retained by the add-drop node; and the end-point node may determine, as a pathway optimal for the wavelength path satisfying the transmission conditions, a path which is determined to require a minimum number of the electrical regenerative relays, on the basis of a cumulative determination result transmitted from the adjacent nodes.

Further, each of the add-drop nodes may retain, as a portion of the cumulatively-transmitted link information, information about a service wavelength of an optical link from the other add-drop node to the add-drop node; and the end-point node may determine an arrangement of wavelengths of an optical link forming the determined optimal pathway, on the basis of service wavelength information included in the link information retained by the end-point node and service wavelength information included in the cumulative link information.

Each of the add-drop nodes may have an electrical regenerative relay function section capable of selectively subjecting to electrical regenerative relay arbitrary wavelengths forming the wavelength multiplexed optical signal; and the end-point node may effectively set, in a add-drop node located in front of the add-drop node which has been determined to require the electrical regenerative relay on the basis of the cumulative determination result, an electrical regenerative relay of the wavelength path to be performed by the electrical regenerative relay function section.

Each of the add-drop nodes may also have a wavelength conversion function section capable of selectively subjecting arbitrary wavelengths forming the wavelength multiplexed optical signal to wavelength conversion; and the end-point node may also effectively set wavelength conversion of the wavelength path to be performed by the wavelength conversion function section, with regard to a add-drop node requiring wavelength conversion of the wavelength path, on the basis of the determined arrangement of wavelengths.

Moreover, each of the add-drop nodes may have a dispersion compensation function section capable of compensating for wavelength dispersion of the wavelength multiplexed optical signal on a per-wavelength basis; and the end-point node may measure a dispersion value and a dispersion slope of an optimal pathway of the wavelength path, and effect a required dispersion compensation setting in the dispersion compensation function section of the add-drop node in the optimal pathway on the basis of a result of measurement.

The present invention also provides an optical transmission node for implementing path optimization which transmits a wavelength multiplexed optical signal, comprising:

(a) a span information retaining section for retaining, as span information, information about conditions of a transmission path between an optical transmission node of interest and another, adjacent node connected thereto; and (b) a span information cumulative transmission section which, in order cumulatively transmit the link information retained in each of the add-drop nodes from the starting-point node to the end-point node, adds the span information retained in the span information retaining section to span information having been received from another, adjacent node and relating to nodes located before the adjacent node, and transmits the added span information to yet another adjacent node.

Here, in a case where the optical transmission node is configured as a add-drop node for effecting add-drop processing of the wavelength multiplexed optical signal, the optical transmission node preferably further comprise, (c) a link information computation section for computing, as link information, transmission path condition information about an optical link from another add-drop node to a node of interest on the basis of cumulative span information transmitted from an adjacent node connected to the node of interest;

(d) a link information retaining section for retaining link information acquired by the link information computation section;

(e) a link information cumulative transmission section which, in order to cumulatively transmit the link information retained by each of the add-drop nodes from the starting-point node to the end-point node, adds the link information retained in the link information retaining section to link information about add-drop nodes located before the other add-drop node, and transmits the added link information to the other, adjacent node; and, (f) an optimal pathway determination section which determines, in a case where the node of interest is the end-point node, as a pathway optimal for the wavelength path a combination of optical links from the starting-point node to the node of interest satisfying predetermined transmission conditions, on the basis of link information retained by the link information retaining section and cumulative link information transmitted from a plurality of adjacent nodes connected to the node of interest.

The optical transmission node may further comprise a transmission/nontransmission determination section for determining whether or not an electrical regenerative relay is required, on the basis of link information retained by the link information retaining section and the cumulative link information from the adjacent node; and a determination result transmission section for transmitting, in a case where the node of interest is the end-point node, a result of determination made by the transmission/nontransmission determination section along with the link information retained by the link information retaining section toward the end-point node. When the add-drop node is the end-point node, the optimal pathway determination section may also be configured to determine, as a pathway optimal for the wavelength path satisfying the transmission conditions, a pathway which has been determined to require a minimum number of electrical regenerative relays, on the basis of a cumulative determination result pertaining to an optical link of the optimal pathway transmitted from the adjacent node.

Further, the link information retaining section may also be configured to retain service wavelength information about an optical link from another add-drop node to a node of interest as a portion of link information to be cumulatively transmitted. In a case where the node of interest is the end-point node, the optical transmission node may further comprise a wavelength arrangement determination section for determining an arrangement of wavelengths of optical links constituting the optimal pathway determined by the optimal pathway determination section, on the basis of service wavelength information included in the link information retained by the link information retaining section and service wavelength information included in cumulative link information transmitted from an adjacent node.

The optical transmission node may further comprise, in a case where the node of interest is the end-point node, an other-node electrical regenerative relay setting section for effectively setting an electrical regenerative relay of the wavelength path with regard to a add-drop node located in front of the add-drop node determined to require the electrical regenerative relay on the basis of the result of cumulative determination.

The optical transmission node may also further comprise an electrical regenerative relay function section capable of selectively subjecting arbitrary wavelengths forming the wavelength multiplexed signal to electrical regenerative relay; and a node-of-interest electrical regenerative relay control section which, in a case where the electrical regenerative relay of the wavelength path at a node of interest is determined to be required on the basis of a result of cumulative determination made by the end-point node, effectively controls the electrical regenerative relay of the wavelength path to be performed by the electrical regenerative relay control section, by means of settings effected by the end-point node.

The optical transmission node may also further comprise an other-node wavelength conversion setting section which sets wavelength conversion of the wavelength path with regard to another add-drop node which requires wavelength conversion of the wavelength path on the basis of an arrangement of wavelengths determined by the wavelength arrangement determination section.

The optical transmission node may further comprise a wavelength conversion function section capable of selectively subjecting arbitrary wavelengths forming the wavelength multiplexed optical signal to wavelength conversion; and a node-of-interest wavelength conversion control section which effectively controls wavelength conversion of the wavelength path to be performed by the wavelength conversion function section in accordance with wavelength conversion settings output from the end-point node based on an arrangement of wavelength with regard to an optimal path determined at the end-point node.

The optical transmission node may further comprise a dispersion measurement section for measuring a dispersion value and a dispersion slope with regard to the optimal pathway of the wavelength path; and an other-node dispersion compensation setting section which effects required dispersion compensation settings, on the basis of a result of measurement performed by the dispersion measurement section, in a dispersion compensation function section of another add-drop node provided in the optimal pathway.

The optical transmission node may further comprise a dispersion compensation function section capable of compensating for wavelength compensation of the wavelength multiplexed optical signal on a per-wavelength basis; and a dispersion compensation control section for controlling dispersion compensation of a node of interest to be performed by the dispersion compensation function section according to a dispersion value pertaining to the optimal pathway achieved in the end-point node and dispersion compensation settings sent from the end-point node on the basis of a result of measurement of the dispersion slope.

BRIEF DESCRIPTION OF THE DRAWINGS

FIG. 3 is a view showing an example of communication data (information transmitted up to a preceding node) used for the nodes shown in FIG. 2;

FIGS. 4A and 4B are views showing an example of communication data (information transmitted up to a preceding link) used in the nodes shown in FIG. 2;

FIG. 7 is a view showing an example of data contents held in respective nodes of the present embodiment;

DESCRIPTION OF THE PREFERRED EMBODIMENTS

[A] Overview

According to the present invention, (1) selection/determination of a path which entails the lowest cost (the minimum number of regenerators and the minimum number of wavelength conversion processes) is performed on the basis of a design philosophy for effecting optimization on a per-path basis, by means of taking into consideration conditions for a transmission path; and (2) a node itself autonomously performs adjustment of a path on a per-path basis.

A regenerator (an O/E/O converter) has the greatest influence on cost at the time of construction of a WDM optical network. Therefore, a node autonomously designs arrangement of regenerators for all possible pathways from a starting point (a point of origin) to an end point in an optical network, on a per-path basis. Among the possible pathways, an optimal pathway is selected/determined in accordance with priority levels provided below.

1. Pathway involving the minimum number of regenerators to be passed through
2. Pathway having a large OSNR allowance
3. Pathway having a small number of nodes to be passed through Moreover, in order to prevent, to the extent possible, occurrence of wavelength conversion in the drop node 1-$i$, a wavelength to be used in the determined pathway is assigned in accordance with the priority levels provided below.

1. A single wavelength can be used from a starting point to an end point.
2. The number of wavelength conversion processes is small.

In order to implement a design and arrangement of regenerators, each node manages fiber (span) data, information (link data) about a link between drop nodes, path data, or the like. As will be described later, these data sets include information, such as an OSNR (an optical-signal-to-noise ratio), a dispersion value, a slope value, a band DCM (Dispersion Compensation Module) value, a PMD (Polarization Mode Dispersion) value, information about wavelengths employed, or the like.

These data sets are cumulatively transmitted among nodes. At an add-drop node (hereinafter also called simply a "drop node") having an add-drop function, a determination is made as to whether or not the node falls within a range where transmission is feasible without use of a regenerator (an electrical regenerative relay) from a node in the starting point or an immediately-preceding generator node. If transmission is not possible, the immediately-preceding drop node is determined to require a regenerator.

These operations are repeated from a starting-point node to an end-point node. Thereby, the number of regenerators used in the pathway, OSNR values between respective regenerators, the number of nodes to be passed through, and a wavelength to be used are determined.

The above-described processing (design) operations are carried out for all possible pathways from the starting point to the end point of the path within the optical network. An optimal path is determined in accordance with the foregoing criteria.

[B] Description of the Embodiment

Figure 1:
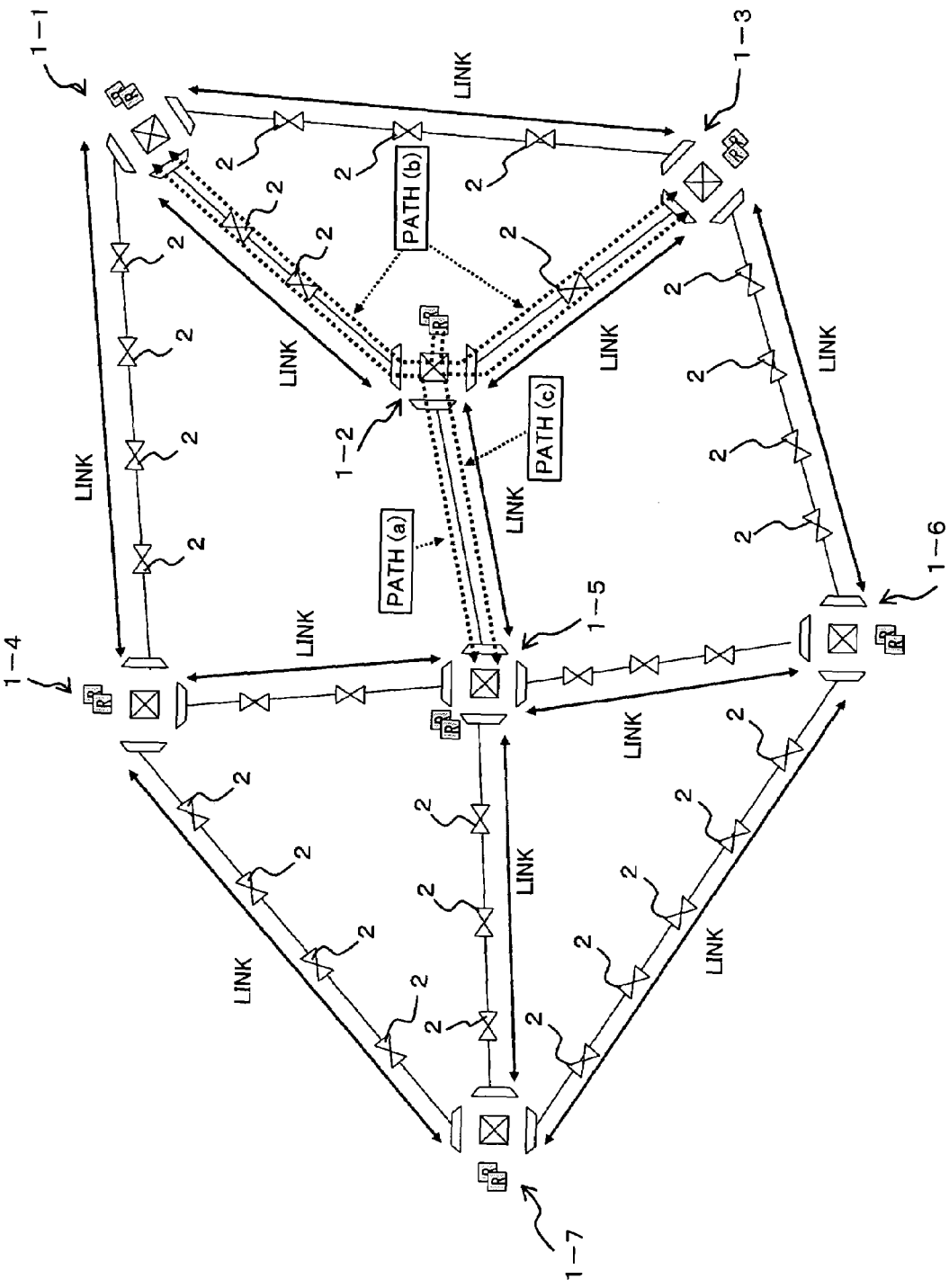
FIG. 1 is a block diagram showing the configuration of a mesh-type optical network according to an embodiment of the present invention.

FIG. 1 is a block diagram showing the configuration of a mesh-type optical network according to the embodiment of the present invention. The optical network shown in FIG. 1 is formed by connecting, to each other in a mesh pattern, a plurality of (seven in FIG. 1) optical transfer nodes (add-drop nodes: which will be hereinafter referred to simply as "drop nodes") 1-1, 1-2, 1-3, 1-4, 1-5, 1-6, and 1-7, each of which has the function of adding/dropping a WDM signal; and a plurality of relay nodes (optical transfer nodes) 2 (having no add-drop function) which relay transfer of the WDM signal among the drop nodes 1-$i$ ($i$=1 to 7). In the following description, the term "node" is often called a "station."

In the present embodiment, when a path (wavelength) of the optical network is designed, there is adopted a design philosophy for designing a path so as to optimize a "3R distance of a path" rather than a design philosophy for designing the path so as to optimize a "3R distance of a system" in the related art. Therefore, a mechanism for flexibly arranging regenerators for each path and a dispersion compensator optimal for each path are prepared. Further, in order to prevent occurrence of an increase in operation cost, which would otherwise be caused as a result of cutting of network cost by optimization on a per-path basis, the apparatus (the node) is made able to autonomously optimize a path without involvement of human operation.

Specifically, an optical network is considered not as an aggregate of 3R systems as in the case of a related art, but as an aggregate of links provided between drop nodes. Fixed arrangement of the regenerators is not performed. A determination as to whether or not a regenerator is required is made for each path on the basis of information about link(s) to be passed through. Nodes are configured so that regenerators and wavelength converters can be selectively connected solely to the path that requires the regenerators.

In the case of, e.g., the configuration shown in FIG. 1, among three paths (a), (b), and (c) indicated by arrows of dotted lines in the drop node 1-2, solely the path (b) requires an electro-regenerative relay (O/E/O conversion), and therefore the regenerator (R) designated by a hatch pattern is connected solely to the path (b).

Figure 2:
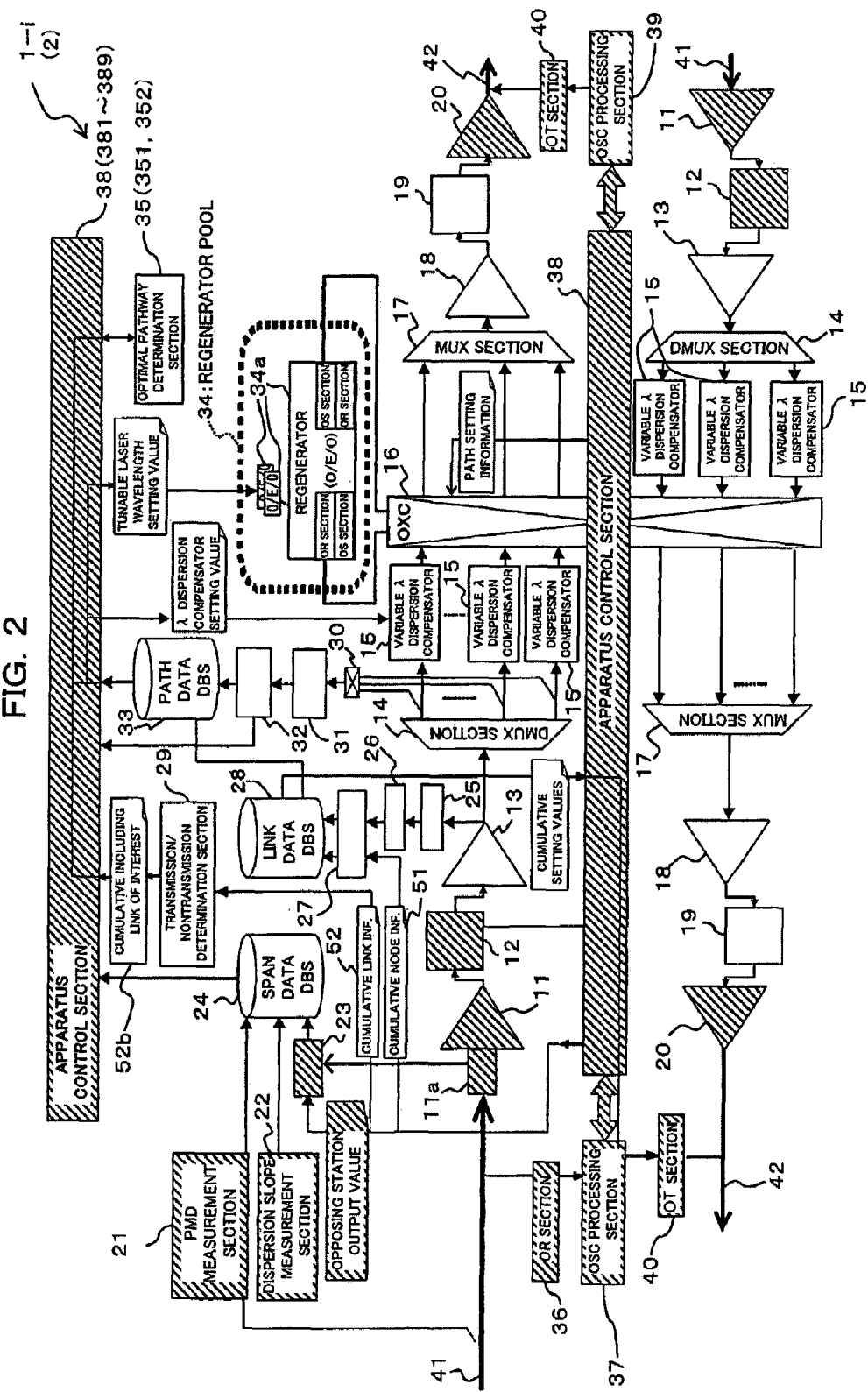
FIG. 2 is a block diagram showing a detailed configuration of nodes in the optical network shown in FIG. 1.

When attention is paid to the principal section of the present embodiment, as shown in, e.g., FIG. 2, each of the drop nodes 1-$i$ constituting the optical network of the present embodiment comprises, as a main signal processing system, a (receiving) pre-amplifier 11 equipped with a power monitor section 11$a$; a (receiving) band-variable dispersion compensator 12; a (receiving) pre-amplifier 13; a wavelength separation (DMUX) section 14; a variable wavelength ($\lambda$) dispersion compensator 15 for each wavelength; an optical cross-connect (OXC) section 16; a wavelength multiplexing (MUX) section 17; a (transmission) pre-amplifier 18; a (transmission) variable band dispersion compensator 19; and a (transmission) pre-amplifier 20. Each of the drop nodes 1-$i$ comprises, as a control system, a PMD measurement section 21; a dispersion slope measurement section 22; a span loss value computation section 23; a span data database (DBS) 24; a spectrum monitor section 25; an OSNR (Optical Signal-to- Noise Ratio) computation section 26; a band dispersion slope compensation value computation section 27; a link data database (DBS) 28; a transmission/nontransmission determination section 29; an optical coupler 30; a wavelength-specific dispersion slope measurement section 31; a wavelength-specific dispersion slope measurement section 32; a path data database (DBS) 33; a regenerator pool 34; an optimal pathway determination section 35; an optical receiving section 36; a (receiving) OSC processing section 37; an apparatus control section 38; a (transmission) OSC processing section 39; and an optical transmission section 40.

The relay node 2 other than the drop node 1-i is configured to have solely hatched sections (the pre-amplifier 11 with the power monitor section 11a; the (receiving) band-variable dispersion compensator 12; the (transmission) pre-amplifier 20; the PMD measurement section 21; the dispersion slope measurement section 22; the span loss value computation section 23; the span data database (DBS) 24; the optical receiving section 36; the OSC processing sections 37, 39; the apparatus control section 38; and the optical transmission section 40) in the configuration shown in FIG. 2 (the remaining sections are provided in only the drop node 1-i). When the drop node 1-i and the relay node 2 are not distinguished from each other in the following description, they are denoted simply as "nodes" without reference symbols.

For reasons of space limitations, the apparatus control section 38 is illustrated in FIG. 2 while being divided into two sections. In reality, the apparatus control section is configured as a single functional block. The OSC processing sections 37 and 39 may also be configured as a single functional block. Moreover, in relation to the configuration of the above-described control system, the detailed configuration of a main signal processing system of only one direction (i.e., a direction from left to right on the paper) is illustrated in FIG. 2. However, in principle, the main signal processing systems of both directions assume the same configuration.

Here, in the above-described main signal processing system, the pre-amplifier 11 amplifies the WDM signal received over the optical transmission path (an optical fiber) 41 to a required level. The power monitor section 11a monitors the receiving power of the WDM signal, and a monitored value is supplied to the span loss value computation section 23.

The variable band dispersion compensator (band DCM) 12 compensates for dispersion (band dispersion) having arisen in the main signal band of the WDM signal amplified by the pre-amplifier 11. The pro-amplifier 13 amplifies, to a required level, the main signal level having dropped in association with the compensation for dispersion performed by the variable band dispersion compensator 12.

The wavelength separation section 14 is for separating the main signal amplified by the pro-amplifier 13 on a per-wavelength basis. Each of the variable wavelength dispersion compensators (dispersion compensation function sections) 15 is for compensating for, on a per-wavelength basis, dispersion of the optical signal having undergone wavelength separation in the wavelength separation section 14. In the present embodiment, the dispersion compensation value is individually set by a setting value sent from the apparatus control section 38.

The optical cross-connect section 16 has a plurality of input ports and a plurality of output ports, which correspond to the respective variable wavelength dispersion compensators 15. In accordance with path setting information provided by the apparatus control section 38, the optical signal, which has been input to an arbitrary input port and has undergone dispersion compensation, is connected to an arbitrary output port, thereby effecting a cross-connected on a per-wavelength basis. However, in the present embodiment, in relation to a path (wavelength) which requires an electrical regenerative relay and/or wavelength conversion at a node of interest as a result of path optimization design to be described later, the optical signal of corresponding wavelength is connected to a wavelength-variable regenerator (O/E/O conversion section) 34a prepared for each wavelength in the regenerator pool 34 so as to pass through the wavelength-variable regenerator.

The wavelength multiplexing section 17 subjects to wavelength multiplexing the optical signals of respective wavelengths having been cross-connected by the optical cross-connect section 16. The post-amplifier 18 amplifies the optical signal (WDM signal), which has been wavelength-multiplexed by the wavelength multiplexing section 17, to a required transmission level.

The variable band dispersion compensator 19 compensates for the dispersion having arisen in the main signal band of the WDM signal amplified by the pre-amplifier 18. The post-amplifier 20 amplifies the transmission level of the main signal having dropped in association with dispersion compensation performed by the variable band dispersion compensator 18, and transmits the thus-amplified main signal to an optical transmission path 42.

In the control system, the PMD measurement section 21 measures (actually measures) a PMD value of the received WDM signal transmitted over the optical transmission path 41. The dispersion slope measurement section 22 measures (actually measures) the dispersion value and/or slope (dispersion of wavelength dependence) of the received WDM signal. The span loss value computation section 23 computes the value of a power loss (the value of a span loss) having arisen (in a receiving span) between an opposing node and a node of object, on the basis of an output value of the opposing node (an adjacent node) and the receiving power of the received WDM signal monitored by the power monitor section 11a. An opposing node output value, which is reported by the opposing node by way of an optical supervision channel (OSC), is employed (the output value is extracted by the OSC processing section 37 and imparted to the span loss value computation section 23 by way of the apparatus control section 38).

The span data DBS (span information retaining section 24) retains, as span data (span data of interest) pertaining to a node of interest, information about transmission path conditions of a receiving span [transmission path condition information, such as a PMD value, a dispersion value/slope, dispersion compensation values of band DCMs 12, 19 of a node of interest, an input (receiving) level, an opposing node output value, a span loss value, or the like]. Initial setting of the information is carried out by manual input/setting of a value determined from data submitted by a client, or the like, through a design on paper.

In the present embodiment, when the apparatus is started up, the PMD measurement section 21 and the dispersion slope measurement section 22 measure the PMD value and the dispersion value/slope. Further, the span loss value computation section 23 computes a span loss value on the basis of the output value of the opposing node and the result of monitoring performed by the power monitor section 11a. Consequently, when a difference exists in specifics of the initial settings, the span data DBS 24 are updated on the basis of the result of measurement. Even when a difference exists between the results of measurement and the initial settings at start-up of the apparatus, each of the nodes automatically corrects span data belonging to itself, thereby obviating a necessity for a manual re-design on paper or manual setting.

The spectrum monitor section 25 receives light output from the post-amplifier 13 and monitors spectra of the thus-received light. On the basis of a result of monitoring performed by the spectrum monitor 25, the OSNR computation section 26 computes an OSNR of the received WDM signal.

The band dispersion slope compensation value computation section (a link information computation section) 27 computes (cumulatively calculates), as link data pertaining to the node of interest (data pertaining to a link of interest), information (an OSNR, a PMD value, a dispersion slope, or the like) about conditions (transmission path conditions) for each optical link from the preceding drop node 1-$i$ to the node of interest, on the basis of the OSNR of the received WDM signal computed by the OSNR computation section 26 and information (cumulative span data) 51 (a PMD value, a dispersion value, dispersion values of respective spans, compensation values/slopes of respective DCMs, and the like, which pertaining to nodes from a preceding drop node 1-$i$ to a preceding node), such as that shown in FIG. 3, which is transmitted from an adjacent node connected to the node of interest and pertains to nodes from the drop node 1-$i$ to a preceding node.

The link data DBS (link information retaining section) 28 retains link data (an OSNR value, a PMD value, a dispersion value/slope, a service wavelength, and the like) for each optical link. As in the case of span data, initial setting of the link data DBS 28 is carried out by manually inputting and setting values determined from data submitted by a client, or the like, through a design on paper. Even in relation to the link data DBS 28, the band dispersion slope compensation value computation section 27 computes band DCM values of all nodes of the corresponding link on the basis of span data (information about nodes up to a preceding node) measured with regard to a corresponding link at the time of start-up of the apparatus. If a difference exists between the initial settings and the computed band DCM values, the band DCM values are reset on the basis of the result of computation and then automatically corrected. At this time, the value of the span DBS 24 is also updated.

In association with an update, if a change in the band DCM value of another node of the same link is required, the band DCM values of nodes up to a preceding node are also reset by way of the apparatus control section 38 and the OSC processing section 39. Moreover, the link data DBS 28 retains another piece of node information about the corresponding link.

Next, the transmission/nontransmission determination section 29 determines whether or not transmission is possible without use of regenerators (electric regenerative relays) of the corresponding path, on the basis of the information (cumulative link data) 52—which pertains to links up to the preceding link and is transmitted by way of the OSC—and the link data retained in the link data DBS 28 of the node of interest. When the result of determination has become NG (transmission is not possible), the preceding link is determined to require a regenerator. The information 52 pertaining to links up to the preceding link includes information 52a for each link pertaining to drop nodes up to the preceding drop node 1-$i$, such as those shown in FIG. 4A, e.g., a OSNR value, a PMD value, a dispersion value, dispersion values of respective spans, compensation values/slopes of respective bands DCMs; and a link table (information about respective links to be passed through) 52b, such as those shown in FIG. 4B; e.g., the number of nodes of a link, presence/absence of a regenerator of a link, a service wavelength of a link, an OSNR value of a link, and the like.

The optical coupler 30 is for introducing the optical signal of each wavelength, which has undergone wavelength separation performed by the wavelength separation section 14, to the wavelength-specific dispersion slope measurement section 31. The wavelength-specific dispersion slope measurement section 31 is for measuring dispersion slope of an optical signal according to wavelengths. The wavelength-specific dispersion slope compensation value computation section 32 is for computing a compensation value of dispersion slope according to a wavelength on the basis of the result of measurement performed by the wavelength-specific dispersion slope measurement section 31.

The path data DBS 33 retains information, such as a wavelength used in a node of interest, dispersion slope of each wavelength, a link passing through the wavelength (path), and the like. In relation to the dispersion slope of each wavelength, values computed by the wavelength-specific dispersion slope compensation value computation section 32 on the basis of the dispersion slope measured by the wavelength-specific dispersion slope measurement section 31 are registered at start of a wavelength. The value is individually set in each of the variable wavelength dispersion compensators 15 by the apparatus control section 38.

The regenerator pool (an electric regenerative relay function section, a wavelength conversion function section) 34 can selectively subject an arbitrary wavelength forming the WDM signal to electric regenerative relay and wavelength conversion. Therefore, a wavelength-variable regenerator (an O/E/O conversion section) 34a having a wavelength-variable (tunable) transmitter is provided for each of wavelengths of the WDM signal. Input and output terminals of the regenerator 34a are connected to the optical cross-connect section 16. By means of the cross-connect setting output from the apparatus control section 38, a path (wavelength) requiring electric regenerative relay and/or wavelength conversion is connected to a corresponding regenerator 34a, and required electric regenerative relay and/or wavelength conversion is selectively carried out on a per-wavelength basis.

The path that does not require electric regenerative relay and wavelength conversion is connected directly to the wavelength multiplexing section 17 by means of the optical cross-connect section 16. The input and output wavelengths of the corresponding regenerator 34a are set to a wavelength adjusted to a port of the wavelength separation section 14 and/or a port of the wavelength multiplexing section 17. For instance, GMPLS (Generalized Multi-Protocol Label Switching) is used for controlling such a connection port.

The optimal pathway determination section 35 acts in a drop node (end-point node) of the path. The optimal pathway determination section 35 compares, with each other, a plurality of pieces of pathway information (link data) which have arrived at a node of interest from an add node (a starting-point node) of the path by way of a plurality of pathways, thereby determining (deciding) an optimal pathway (a combination of optical links) from a starting-point node (an add node) 1-$i$ of the path to a drop node 1-$i$ which is an end-point node of the path and determining (deciding) wavelengths (the arrangement of wavelengths) optimal for use in the pathway.

Specifically, the optimal pathway determination section 35 doubles also as respective sections 351, 352 (see FIG. 2) shown in (a), (b) provided below.

(a) Function of an optimal pathway determination section 351 which determines, as a pathway optimal for a path, a combination of optical links satisfying predetermined transmission conditions (e.g., a pathway having a small number of regenerators) of the nodes from the starting-point node to the node of interest which is the end-point node, on the basis of the link data in the link data DBS 28 and the cumulative link data 52 transmitted from the plurality of adjacent nodes connected to the node of interest, when the node of interest is an end point node of the path.

(b) Function of a wavelength arrangement determination section 352 which determines, when the node of interest is an end-point node of the path, the arrangement of wavelengths of optical links forming an optimal pathway determined by the optimal pathway determination section 351 on the basis of the link data retained in the link data DBS 28 and the cumulative link data 52 transmitted from adjacent nodes.

The optical receiving section 36 receives the WDM signal transmitted over the optical transmission path (optical fiber) 41. The OSC processing section 37 extracts supervision control information transmitted by an optical signal of a wavelength, which is assigned as an optical supervision control channel (OSC), of the WDM signal received by the optical receiving section 36, and performs processing corresponding to the information. In the present embodiment, this supervision control information includes the cumulative span data 51 which are transmitted from another node and pertain to nodes before the previously-described preceding node, and the cumulative link data 52 before a preceding link.

The OSC processing section 39 is for superimposing the supervision control information oriented for another node of a subsequent stage (including the information 51 pertaining to nodes up to a preceding node+data pertaining to a span of interest, and the information 52 pertaining to all links+data pertaining to a link of interest) on an optical signal of OSC generated by the optical transmission section 40, and transmitting the information along with the WDM signal to be transmitted over the optical transmission path 42.

In relation to the above-described OSC, an unassigned wavelength is assigned specifically to the main signal, and there is specifically used, e.g., an undefined byte of an optical transmission section (OTS) layer terminated at each node within an overhead byte (OHB).

The apparatus control section 38 controls the entirety of a node of interest. The apparatus control section 38 sets dispersion compensation values of the variable band dispersion compensators 12, 19 and a dispersion compensation value of the variable wavelength dispersion compensator 15, a cross-connect (a path) in the optical cross-connect section 16, a wavelength (conversion) in the regenerator pool 34 (the regenerator 34a), and the like. Moreover, the apparatus control section 38 is configured to have functions as designated below by (a) to (i).

(a) Function of a span data cumulative transmission section 381 which, in order to cumulatively transmit the span data retained in each of the nodes from the drop node 1-i—which is to become a starting-point node of a path—toward a drop node 1-i—which is to become an end-point node of the path—adds span data retained in the span data DBS 24 of a node of interest to the (cumulative) span data 51 pertaining to nodes before a preceding node and transmits the data to another node (a node in a subsequent stage) by way of the OSC.

(b) Function of a link data cumulative transmission section 382 which, in order to cumulatively transmit the link data retained in each of the drop nodes 1-i from the starting-point node to the end-point node, adds the link data retained in the link data DBS 28 to the (cumulative) link data pertaining to nodes up to the preceding node 1-i and transmits the data to an adjacent node (a node in a subsequent stage) by way of the OSC.

(c) Function of a transmission/nontransmission determination result transmission section 383 which cumulatively transmits a result of determination made by the transmission/nontransmission determination section 29 [information (link table) 52b pertaining to links up to a target link] toward the end-point node along with the link data by way of the OSC.

(d) Function of an other-node electrical regenerative relay setting section 384 which, when the node of interest is an end-point node of the path, effectively sets an electrical regenerative relay of a path by setting the port connection of the optical cross-connect section 16 by way of the OSC such that the path passes through the regenerator 34a, in connection with the drop node 1-i situated in front of the drop node 1-i that has been determined to require the regenerator 34a (electrical regenerative relay) on the basis of the result of cumulative determination.

(e) Function of a node-of-interest electrical regenerative relay control section 385 which, when the node of interest is a node other than the end-point node of a path and when the path of the node of interest is determined to require an electrical regenerative relay on the basis of the result of cumulative determination made by the end-point node, controls settings of the port connection of the optical cross-connect section 16 by means of the setting sent from the end-point node, and effectively controls the electrical regenerative relay of a corresponding path performed by the regenerator 34a.

(f) Function of an other-node wavelength conversion setting section 386 which, when the node of interest is the end-point node of the path, sets wavelength conversion of the path for another drop node 1-i requiring wavelength conversion of a path, on the basis of the arrangement of wavelengths determined by the optimal pathway determination section 35 (the wavelength arrangement determination section 351) by way of the OSC.

(g) Function of a node-of-interest wavelength conversion control section 387 which, when the node of interest is a node other than the end-point node of the path, effectively controls wavelength conversion performed by the regenerator 34a of the corresponding path by means of wavelength conversion settings which are output from the end-point node and based on the arrangement of wavelengths of the optimal pathway determined at the end-point node.

(h) Function of an other-node dispersion compensation setting section 388 which, when the node of interest is the end-point node of the path, makes a required dispersion compensation setting in the variable wavelength dispersion compensator 15 of another drop node 1-i in the optimal pathway by way of the OSC, on the basis of the result of measurement of the wavelength-specific dispersion slope measurement section 31 (the dispersion value and the dispersion slope) with regard to the optimal pathway of the path determined by the optimal pathway determination section 35.

(i) Function of a node-of-interest dispersion compensation control section 389 which, when the node of interest is a node other than the end-point node of the path, controls dispersion compensation performed by the variable wavelength dispersion compensator 15 of the node of interest according to the dispersion compensation setting output from the end-point node based on the result of measurement of the dispersion value and the dispersion slope pertaining to the optimal pathway at the end-point node.

Specifically, the apparatus control section 38 has functions: namely, (1) the function of cumulatively transmitting span data and link data; (2) the function of making required settings (a connection setting of the regenerator 34a of the path, a wavelength conversion setting, setting of a dispersion compensation value in the variable wavelength dispersion compensator 15, or the like) to another node in the pathway, by way of the OSC and on the basis of the result of determination made by the optimal pathway determination section 35 (an optimal pathway and an optimal wavelength used in that pathway) when a node of interest is an end-point node (a drop node); (3) the function of controlling a connection setting and a wavelength conversion setting to the regenerator 34a of the path in the node of interest according to the setting information sent from the end-point node by way of the OSC, and setting of a dispersion compensation value to the wavelength variable dispersion compensator 15; and the like.

Figure 5:
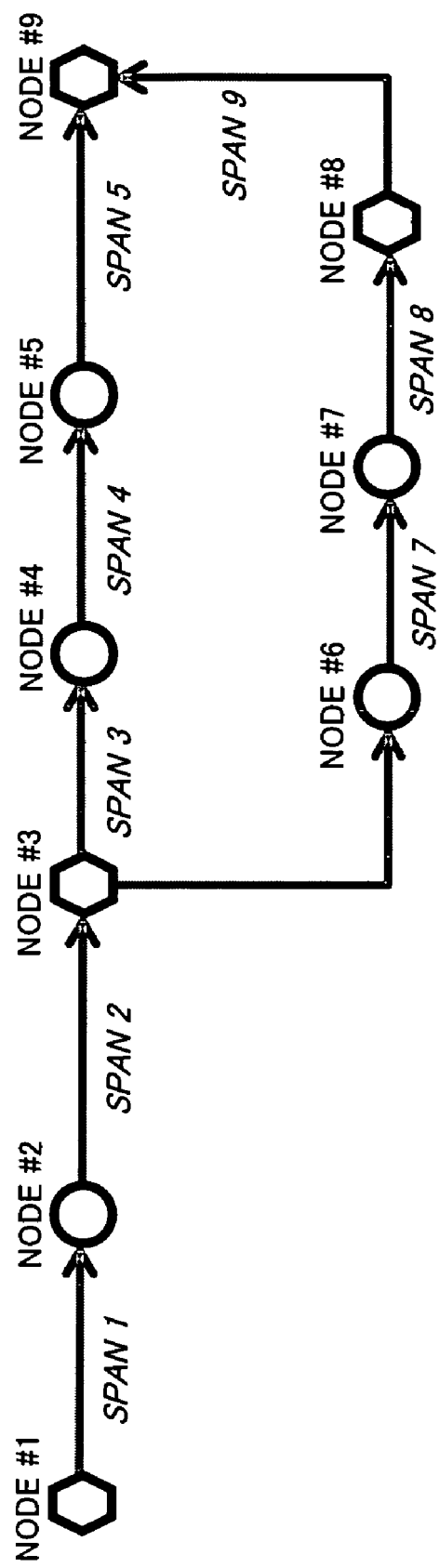
FIGS. 5 and 6 are block diagrams showing the configuration of an optical network, in a simplified manner, in order to explain a method for optimizing a path in the optical network of the present embodiment.
Figure 6:
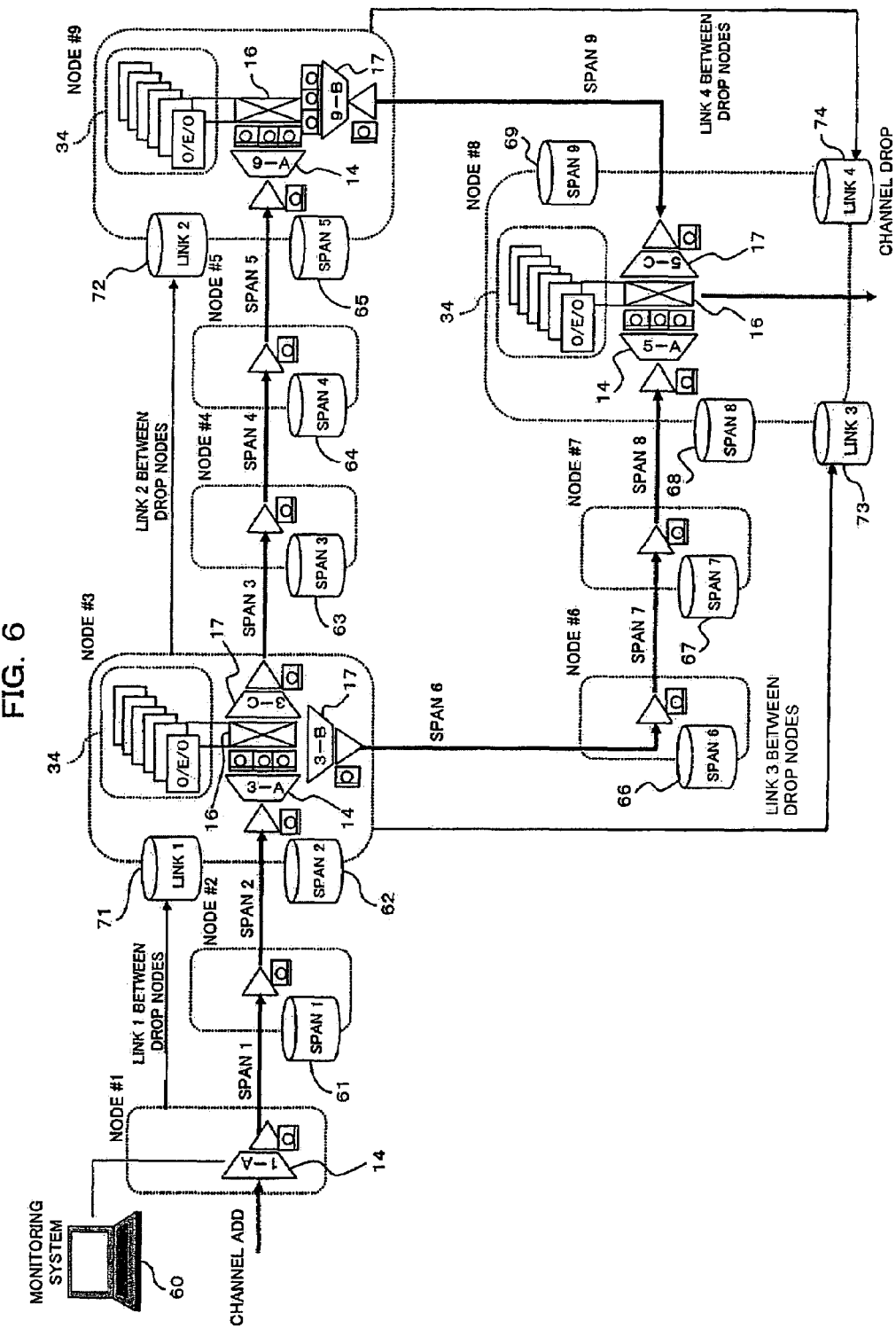

A path optimization method for the optical network configured by use of the nodes configured as mentioned previously will now be described in detail. To simplify descriptions, as shown in FIGS. 5 and 6, the optical network is embodied as a simple configuration consisting of nine nodes #1 to #9. Nodes #1, #3, #8, and #9, each of which has an add-drop function, are assumed to be configured as drop nodes, and other nodes are assumed to be configured as relay nodes which do not have the add-drop function. A space between a node #n and a node #n+1 (n=1 to 8) is designated as a span "n," and span data pertaining to the span "n" are designated as span "n" data 6n.

As shown in FIG. 6, an optical link between the drop nodes #1 and #3 is designated as a link 1; an optical link between the drop nodes #3 and #9 is designated as a link 2; an optical link between the drop nodes #3 and #8 is designated as a link 3; an optical link between the drop nodes #8 and #9 is designated as a link 4; and link data pertaining to a link "k" (k=1 to 4) are designated as link "k" data 7k.

In the present embodiment, transmission conditions for the case where a path is set under conditions optimal for a path are as follows; namely, a path between the nodes #1 to #3 is assumed to enable transmission without a regenerator; a path among the nodes #1, #3, and #8 is assumed to enable transmission without a regenerator; a path among the nodes #1, #3, and #9 is assumed to enable transmission without a regenerator; and a path among the nodes #1, #3, #9, and #8 is assumed to require a regenerator to enable transmission.

In the link 1, wavelengths (numbers) #1 to #20 are assumed to have already been in service. In the link 2, wavelengths #16 to #30 are assumed to have already been in service. In the link 3, the wavelengths #1 to #15 and wavelengths #25 to #40 are assumed to have already been in service. In the link 4, the wavelengths #25 to #40 are assumed to have already been in service. Contents of the span data, the link data, and the path data, all of which are retained by the respective nodes #1 to #9, are as shown in FIG. 7.

(1) First, the regenerator pool 34 has been set in advance in the nodes #3, #8, and #9 under the conditions submitted by the client at the time of a plan for laying a line or a plan for purchasing an apparatus.

(2) A monitoring system 60 (see FIG. 6) activates the node #1 so as to monitor the path from the node #1 to the node #8.

(3) The node #1 (a starting-point node) transmits to the adjacent node #2 search of a path whose end-point node is the node #8.

(4) The node #2 adds span-2 data 62 to search of the pathway by reference to the span data DBS 24 of the node of interest, and transmits the data to the adjacent node #3 by way of the OSC.

(5) The node (drop node) #3 causes the transmission/nontransmission determination section 29 to make a determination as to whether or not transmission is possible, on the basis of span-1 data 61 transmitted from the node #2 and the span data (span-2 data) 62 of the node of interest. At this time, when a difference has arisen between the span data 62 and the link-1 data 71, the link data (link-1 data) 71 of the link data DBS 28 are updated.

(6) When transmission is possible (transmission is possible in the present embodiment), the end-point information (a node number of the node #8) and the link-1 data 71 are transmitted to the adjacent nodes #4 and #6 by way of the OSC.

(7) The node #4 adds span-3 data 63 of the node of interest to the link-1 data 71 transmitted from the node #3, and transmits the data to the adjacent node #5 by way of the OSC.

(8) The node #5 adds span-4 data 64 pertaining to the node of interest to the link-1 data 71 and the span-3 data 63, which have been transmitted from the node #4, and transmits the data to the adjacent node (drop node) #9 by way of the OSC.

(9) The node (drop node) #9 determines whether or not transmission is possible, on the basis of the link-1 data 71 and the span-3 data 63, by means of the transmission/nontransmission determination section 29, the span-4 data 64, and the span data of interest (span-5 data) 65, which have been transmitted from the node #5. At this time, when a difference has arisen between the link-1 data 71 and the link-2 data 72, the link-2 data 72 in the link data DBS 27 are updated.

(10) When transmission is possible (transmission is possible in the present embodiment), the end-point node information, the link-1 data 71, and the link-2 data 72 are transmitted to the adjacent node #8. When transmission is not possible, the drop node #3, which is an end-point node of the preceding link, is determined to require the regenerator 34a. The end-point node information, the link-1 data 71+the necessity for a regenerator (presence), and the link-2 data 72 are transmitted to the adjacent node (an end-point node) #8 by way of the OSC.

(11) The adjacent node (an end-point node) #8 determines whether or not transmission is possible by means of the transmission/nontransmission determination section 29, on the basis of the link-1 data 71, the link-2 data 72—all having been transmitted from the node #9—and the span data (span-9 data) 69. At this time, when a difference has arisen in the link data 74, the link data (link-4 data) 74 in the link data DBS 28 are updated.

(12) When transmission is not possible (transmission is not possible in the present embodiment), the node #9, which is the end-point node of the preceding link, is determined to require the regenerator 34a.

(13) In the present embodiment, since the node #8 is an end-point node, the link-1 data 71, the link-2 data 72, the link-4 data 74, and the necessity for a regenerator in the link 2 are recorded as information about a pathway from the starting-point node #1 to the node of interest #8 without performing transmission of data to another, adjacent node.

(14) The node #6, to which the end-point node information and the link-1 data 71 have been transmitted from the drop node #3 in step (6), adds span-6 data 66 pertaining to the node of interest to the end-point node information and the link-1 data 71, and transmits the data to the adjacent node #7 by way of the OSC.

(15) The node #7 adds span-7 data 67 pertaining to the node of interest to the end-point node information, the link-1 data 71, and the span-6 data 66, which have been transmitted from the node #6, and transmits the data to the adjacent node (end-point node) #8.

(16) The adjacent node (an end-point node) 8 determines whether or not transmission is possible, on the basis of the transmitted link-1 data 71, the span-6 data 66, the span-7 data 67, and span data (span-8 data) 68, by means of the transmission/nontransmission determination section 29. At this time, when a difference has arisen in the link-3 data 73, the link data (link-3-data) 73 in the link data DBS 28 are updated.

(17) The node #8 is an end-point node in the present embodiment, and hence, when transmission is possible, the link-1 data 71 and the link-3 data 73 are recorded as information about another pathway from the starting-point node #1 to the node of interest #8.

(18) The end-point node #8 compares the pathway information recorded in step (13) with the pathway information recorded in step (17), thereby determining/selecting a pathway optimal for the path according to the previously-described priorities (1: a pathway involving the minimum number of regenerators to be passed through, 2: a pathway having a large OSNR margin, and 3: a pathway having a smaller number of nodes to be passed through). In the present embodiment, a pathway formed from a combination of the links 1 and 3, which involve a smaller number of (few) regenerators, is selected as an optimal pathway.

(19) Next, the end-point node #8 determines a wavelength used in the optimal pathway in accordance with the previously-described priorities (1: a single wavelength can be used from a starting-point to an end-point, and 2: the number of wavelength-conversion operations is small). In the present embodiment, wavelengths other than wavelengths 1 to 20 (for the link 1) and the wavelengths 1 to 15 and 25 to 40 (for the link 3) are usable. Therefore, for instance, the wavelength #21 is assigned as a wavelength to be used in the optimal pathway.

(20) The node #8 activates the starting-point node #1, the end-point node #8, the link 1 to the link 3, and the path for the wavelength #21 with respect to all the nodes #1, #2, #3, #6, and #7 in the pathway.

(21) Thereby, the starting-point node #1 and the end-point node #8 activate the light source of the wavelength #21.

(22) The drop node #3 sets a path to the optical cross-connect section 16 by means of the apparatus control section 38 through use of the GMPLS, so as to connect the port of the wavelength #21 of the wavelength separation section 14 (3-A) with the port of the wavelength #21 of the wavelength multiplexing section 17 (3-B) on the side of the node #6. Provided that the regenerator 34a is required in the node #3, settings are made in the optical cross-connect section 16 such that the port of the wavelength #21 of the wavelength separation section 14 (3-A) is connected to an input port of the corresponding regenerator 34a of the regenerator pool 34, and such that the output port of the regenerator 34a is connected to the port of the wavelength #21 of the wavelength multiplexing section 17 (3-B). At that time, if wavelength conversion is necessary, the regenerator 34a also effects wavelength conversion.

(23) Subsequently, the end-point node #8 measures a dispersion slope of the wavelength #21, computes an individual dispersion compensation value required for the link 1 (the node #3) and the link 3 (the node #8), and makes setting of a dispersion compensation value in the node #3 and the node #8 on the basis of the result of computation.

(24) Then, the node #8 again measures a dispersion slope, and ascertains that the thus-measured dispersion slope falls within a transmittable range.

(25) After step (22), the (reverse) dispersion slope of the wavelength #21 is measured at the starting-point node #1 as well. Individual dispersion compensation values required for the link 1 (the node #1) and the link 3 (the node #3) are computed. On the basis of the result of computation, the dispersion compensation value is set for the nodes #1 and #3.

(26) Subsequently, the node #1 again measures the dispersion slope, and the thus-measured dispersion slope is ascertained to fall within the transmittable range.

(27) Activation is completed at a point in time when ascertainment of transmission has been completed in both the nodes #1 and #8, and the starting-point node #1 and the end-point node #8 respectively report the pathway to the monitoring system 60.

Figure 8:
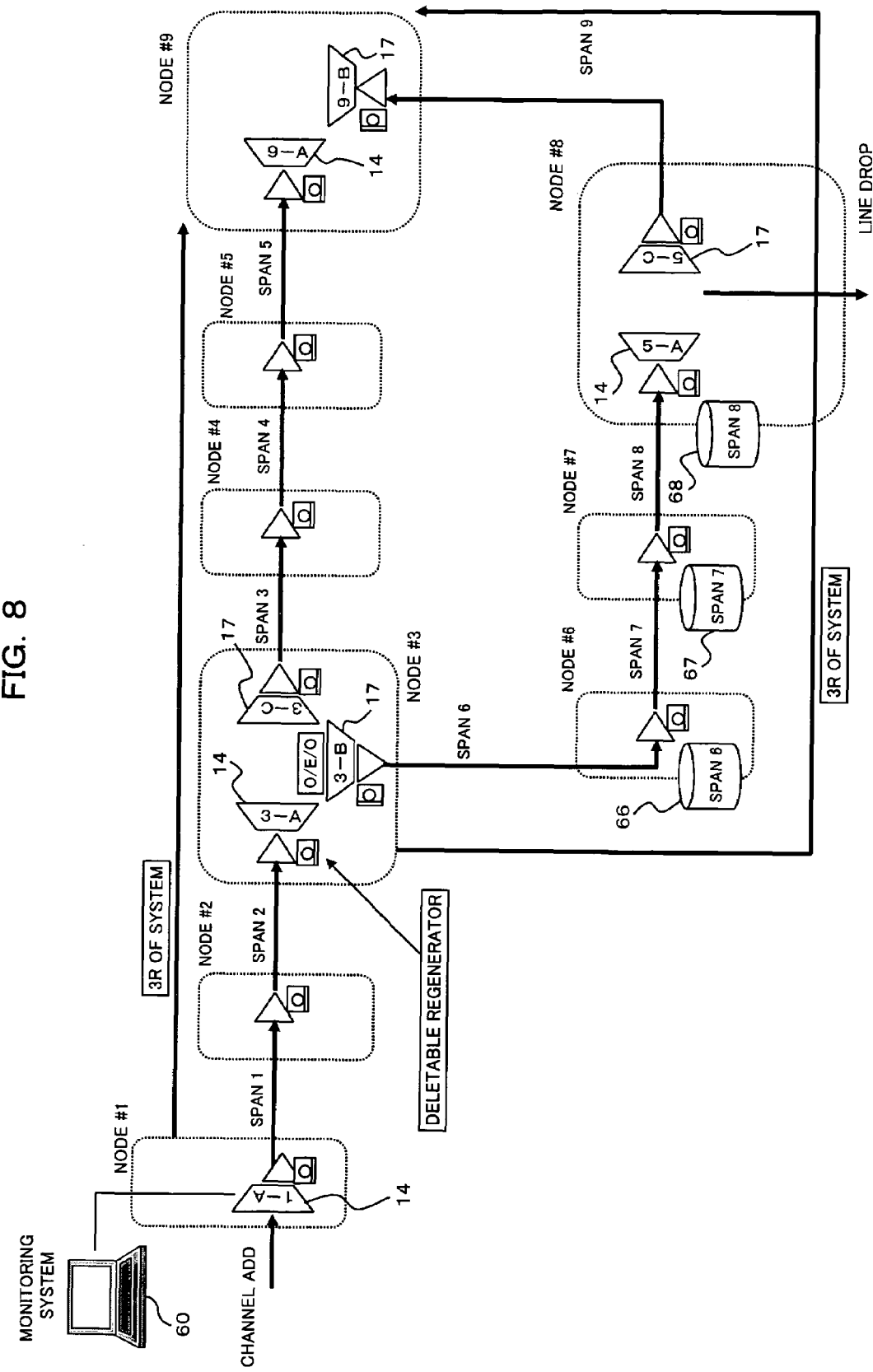
FIG. 8 is a view showing the configuration of the optical network, in a simplified manner, in order to describe an advantage attained by the path optimizing method of the present embodiment.
Figure 9:
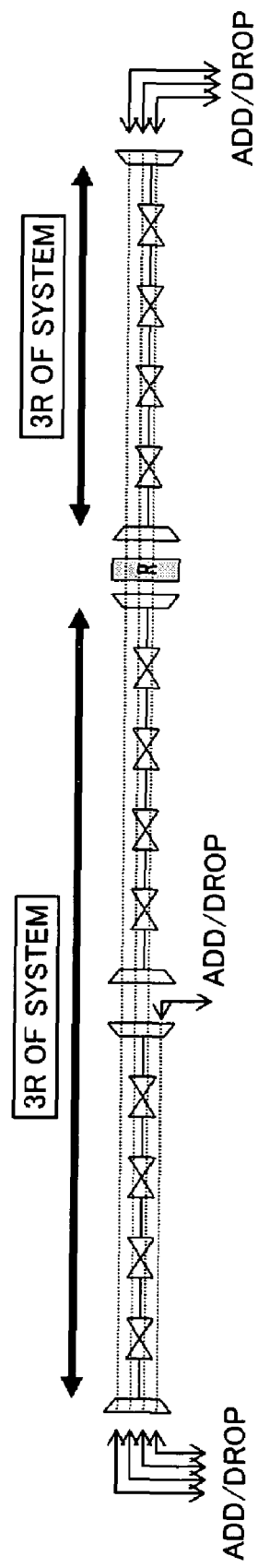
FIG. 9 is a block diagram showing an example point-to-point optical network for describing a conventional network design.
Figure 10:
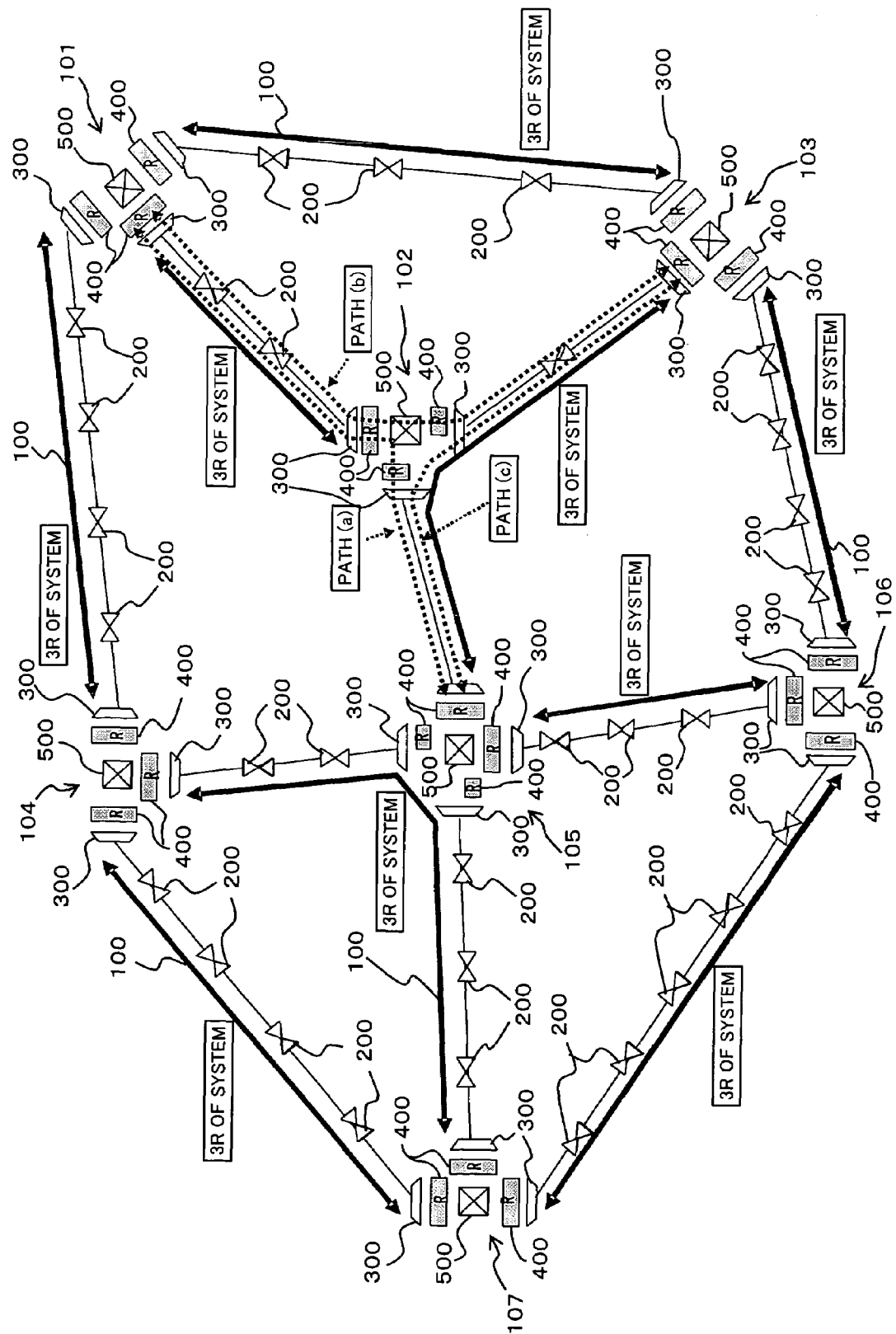
FIG. 10 is a block diagram showing an example mesh-type network constructed by application of the conventional network design.

When a network configuration identical with that described in connection with the present embodiment is subjected to optimization design with the conventional system 3R, two point-to-point systems; namely, one 3R system from the node #1 to the node #9 and another 3R system from the node #3 to the node #9, are constructed as shown in FIG. 8. In the path from the node #1 to the node #8, the node #3 requires a regenerator. Consequently, in the present embodiment, requirement for the regenerator in the node #3 can be understood to be curtailed by means of the previously-described procedures.

As has been described above, according to the present embodiment, information about a fiber connected to each node (e.g., span data, such as a transmission path loss value, a dispersion, a slope, a PMD, and the like, for each span) is retained. Information about links between drop nodes (link data, such as an OSNR value, a dispersion, a slope, a PMD value, and the like, which pertain to each link) and information about a wavelength in service (path data) have previously been retained in the drop nodes. When a path is added, these pieces of information are cumulatively transmitted from a drop node 1-$i$, which is to become a starting-point of a path, to another drop node 1-$i$, which will become an end point of the path. The end-point node 1-$i$ effects design of the arrangement of regenerators (determination) and compares the pathways with each other. The node 1-$i$ can autonomously detect/determine a pathway optimal for the optical network—the pathway satisfies predetermined transmission conditions—on the basis of the number of regenerators/a wavelength in service.

In the determined optimal pathway, the drop node 1-$i$ can autonomously determine an optimal arrangement of wavelengths from the wavelengths available for the link and effect wavelength conversion as required.

Consequently, the load imposed on line design of the client can be mitigated, and optimization design for each path (wavelength) matching the mesh-type optical network can be carried out by means of operation equivalent to that performed in the point-to-point network (i.e., without involvement of an increase in operation cost). An attempt to curtail cost of network equipment can be realized.

In order to effect optimization design for each path, the variable dispersion compensator 15 is provided in each node according to a path. An optimal dispersion compensation value appropriate to the condition of the transmission path is computed on a per-path basis, and the dispersion compensation value can be automatically, individually set. Accordingly, a mesh-type network optimized for the path can be embodied without involvement of an increase in operation cost.

Moreover, in the drop node 1-$i$, the transmission/nontransmission determination section 29 automatically determines that a drop node 1-$i$ which is located immediately before the node falls out of the transmittable range. Hence, a node requiring an electrical regenerative relay (the regenerator 34a) can be automatically determined on a per-path basis. Minimum required design of a regenerator can be embodied.

The regenerator pool 34 having the wavelength variable regenerator 34a has been provided in advance in the drop node 1-$i$. Connection settings in the node 1-$i$ are made in such a way that only the path requiring an electrical regenerative relay selectively passes through a corresponding regenerator 34a. Hence, arranging an efficient regenerator in only the path that requires an electrical regenerative relay can be embodied.

Consequently, arranging a regenerator in only the path requiring a regenerator with respect to any WDM channel used in a single site (node) can be readily embodied. The number of regenerators in the entire optical network can be minimized. Moreover, even at the time of addition of a path, a necessity for dispatching an employee to a node arrangement site in order to arrange a regenerator can also be obviated.

Even when a difference has arisen between initial fiber information (initial settings of span data and link data), which has been set as a result of the arrangement of an apparatus of the network having been first determined on paper from the data submitted by the client at the time of laying of a line or purchase of the apparatus, and real fiber information, the initial fiber information can be automatically corrected on the basis of the information actually measured by the node of interest even at start-up of the apparatus. Accordingly, optimization can be carried out without involvement of complicated re-design or changes in articles (dispersion compensators).

The pathway setting of the path determined by the node and the arrangement of regenerators can be reflected on cross-connect by means of controlling cross-connect through use of the GMPLS.

[C] Others

In the above-described embodiment, the span data and the link data determined as cumulative data of the span data are cumulatively transmitted from the starting-point node to the end-point node. In principle, the objective of the present invention can be achieved by means of cumulative transmission of only span data.

When only the span data have been transmitted, the end-point node must compute all pathways from the starting-point node to the end-point node. This results in an increase in the processing load of the end-point node. Moreover, when a path simultaneously having a plurality of different starting points/end points is activated, there arises a necessity for re-computing data (parameters), which must be computed/retained on a per-link basis. Therefore, as mentioned previously in connection with the embodiment, it is more efficient for the drop node to compute/retain the parameters involved in the respective links on a per-link basis.

As has been described in detail, according to the present invention, each of the nodes constructing the optical network can cumulatively transmit information about conditions of an optical transmission path connected to the node, and can autonomously determine/decide a pathway optimal to the path on the basis of the information. Accordingly, load imposed on design of the line performed by the client can be lessened, and optimization design can be performed for each path (wavelength) matching the mesh-type optical network without involvement of an increase in operation cost. Therefore, utility of the present invention in the field of optical communication can be considered to be extremely high.

What is claimed is:

1. A path-optimizing method for use with an optical network formed by mutually connecting a plurality of optical transmission nodes for transmitting a wavelength multiplexed optical signal to a plurality of add-drop nodes for executing add-drop processing of said wavelength multiplexed optical signal, wherein said optical transmission nodes and said add-drop nodes retain, as span information, information about conditions of transmission paths between other adjacent nodes connected to said optical transmission nodes and said add-drop nodes;

said span information retained in each of said nodes is cumulatively transmitted from one of said plurality of add-drop nodes, which is to be a starting-point node of a certain wavelength path, to another of said plurality of add-drop nodes, which is to be an end-point node of said wavelength path;

said end-point node autonomously determines a pathway satisfying predetermined transmission conditions as a pathway optimal for said wavelength path on the basis of cumulative span information which is transmitted in connection with a plurality of pathways from said starting-point node to said end-point node;

each of said add-drop nodes has an electrical regenerative relay function section selectively subjecting at least one of one or more wavelengths forming said wavelength multiplexed optical signal to electrical regenerative relay; and when the electrical regenerative relay is determined to be required according to a result of cumulative determination made by said end-point node, said end-point node effectively controls the electrical regenerative relay function section of said add-drop nodes in the pathway determined by said end-point node.

2. The path-optimizing method for use with an optical network according to claim 1, wherein each of said add-drop nodes acquires information about transmission path conditions of an optical link from another add-drop node to said add-drop node on the basis of said cumulative span information transmitted from adjacent nodes connected to said add-drop node, and retains said information as link information;

said link information retained by each of said add-drop nodes is cumulatively transmitted from said starting-point node to said end-point node; and said end-point node determines a combination of optical links, which satisfy predetermined transmission conditions, from said starting-point node to said end point node as a pathway optimal for said wavelength path, on the basis of link information retained by said end-point node and cumulative link information transmitted from a plurality of adjacent nodes connected to said end-point node.

3. The path-optimizing method for use with an optical network according to claim 2, wherein each of said add-drop nodes determines whether or not the electrical regenerative relay is required, on the basis of link information retained by said add-drop node and said cumulative link information from said adjacent nodes, and cumulatively transmits a result of determination to said end-point node along with said link information retained by said add-drop node; and said end-point node determines, as a pathway optimal for said wavelength path satisfying said transmission conditions, a path which is determined to require a minimum number of said electrical regenerative relays, on the basis of a cumulative determination result transmitted from said adjacent nodes.

4. The path-optimizing method for use with an optical network according to claim 3, wherein each of said add-drop nodes retains, as a portion of said cumulatively-transmitted link information, information about a service wavelength of an optical link from said other add-drop node to said add-drop node; and said end-point node determines an arrangement of wavelengths of an optical link forming said determined optimal pathway, on the basis of service wavelength information included in said link information retained by said end-point node and service wavelength information included in said cumulative link information.

5. The path-optimizing method for use with an optical network according to claim 3, wherein
said end-point node effectively controls, in an add-drop node located in front of said add-drop node which has been determined to require said electrical regenerative relay on the basis of said cumulative determination result, the electrical regenerative relay of said wavelength path to be performed by said electrical regenerative relay function section.

6. The path-optimizing method for use with an optical network according to claim 4, wherein each of said add-drop nodes has a wavelength conversion function section capable of selectively subjecting at least one of the one or more wavelengths forming said wavelength multiplexed optical signal to wavelength conversion; and
said end-point node effectively sets wavelength conversion of said wavelength path to be performed by said wavelength conversion function section, with regard to an add-drop node requiring wavelength conversion of said wavelength path, on the basis of said determined arrangement of wavelengths.

7. The path-optimizing method for use with an optical network according to claim 1, wherein each of said add-drop nodes has a dispersion compensation function section capable of compensating for wavelength dispersion of said wavelength multiplexed optical signal on a per-wavelength basis; and
said end-point node measures a dispersion value and a dispersion slope of an optimal pathway of said wavelength path, and effects a required dispersion compensation setting in said dispersion compensation function section of said add-drop node in said optimal pathway on the basis of a result of measurement.

8. An optical transmission node for implementing path optimization which transmits a wavelength multiplexed optical signal, comprising:
a span information retaining section for retaining, as span information, information about conditions of a transmission path between an optical transmission node of interest and another adjacent node connected thereto;
a span information cumulative transmission section, which cumulatively transmits, in order, the span information retained in each of a plurality of add-drop nodes from a starting-point node to an end-point node, adds said span information retained in said span information retaining section to the span information received from the another adjacent node and relating to nodes located before said another adjacent node, and transmits said added span information to yet another adjacent node; and
an optimal pathway determination section which determines, in a case where a node of interest is said end-point node, as a pathway optimal for said wavelength path a combination of optical links from said starting-point node to said node of interest satisfying predetermined transmission conditions, on the basis of span information retained by said span information retaining section and cumulative span information transmitted from a plurality of adjacent nodes connected to said node of interest;
each of said add-drop nodes has an electrical regenerative relay function section selectively subjecting at least one of one or more wavelengths forming said wavelength multiplexed optical signal to electrical regenerative relay; and
when the electrical regenerative relay is determined to be required according to a result of cumulative determination made by said end-point node, said end-point node effectively controls the electrical regenerative relay function section of said add-drop nodes in the pathway determined by said optimal pathway determination section.

9. The optical transmission node for implementing path optimization according to claim 8, further comprising, in a case where said optical transmission node is configured as an add-drop node for executing add-drop processing of said wavelength multiplexed optical signal,
a link information computation section for computing, as link information, transmission path condition information about an optical link from another add-drop node to said node of interest on the basis of cumulative span information transmitted from an adjacent node connected to said node of interest;
a link information retaining section for retaining link information acquired by said link information computation section; and
a link information cumulative transmission section which, in order to cumulatively transmit said link information retained by each of said add-drop nodes from said starting-point node to said end-point node, adds said link information retained in said link information retaining section to link information about add-drop nodes located before said other add-drop node, and transmits said added link information to said other, adjacent node, wherein
said optimal pathway determination section determines, in the case where said node of interest is said end-point node, as the pathway optimal for said wavelength path a combination of optical links from said starting-point node to said node of interest satisfying predetermined transmission conditions, on the basis of link information retained by said link information retaining section and cumulative link information transmitted from a plurality of adjacent nodes connected to said node of interest.

10. The optical transmission node for implementing path optimization according to claim 9, further comprising:
a transmission/nontransmission determination section for determining whether or not the electrical regenerative relay is required, on the basis of link information retained by said link information retaining section and said cumulative link information from said adjacent node; and
a determination result transmission section for transmitting, in a case where said node of interest is said end-point node, a result of determination made by said transmission/nontransmission determination section along with said link information retained by said link information retaining section toward said end-point node, wherein, when said add-drop node is said end-point node, said optimal pathway determination section is configured to determine, as a pathway optimal for said wavelength path satisfying said transmission conditions, a pathway which has been determined to require a minimum number of the electrical regenerative relays, on the basis of a cumulative determination result pertaining to an optical link of said optimal pathway transmitted from said adjacent node.

11. The optical transmission node for implementing path optimization according to claim 10, wherein said link information retaining section is configured to retain service wavelength information about an optical link from another add-drop node to a node of interest as a portion of link information to be cumulatively transmitted; and, in a case where said node of interest is said end-point node, said optical transmission node further comprises a wavelength arrangement determination section for determining an arrangement of wavelengths of optical links constituting said optimal pathway determined by said optimal pathway determination section, on the basis of service wavelength information included in said link information retained by said link information retaining section and service wavelength information included in cumulative link information transmitted from an adjacent node.

12. The optical transmission node for implementing path optimization according to claim 10, further comprising, in a case where said node of interest is said end-point node, an other-node electrical regenerative relay setting section for effectively setting the electrical regenerative relay of said wavelength path with regard to an add-drop node located in front of said add-drop node determined to require said electrical regenerative relay on the basis of said result of cumulative determination.

13. The optical transmission node for implementing path optimization according to claim 10, further comprising:
   the electrical regenerative relay function section selectively subjecting at least one of the one or more wavelengths forming said wavelength multiplexed signal to electrical regenerative relay; and
   a node-of-interest electrical regenerative relay control section which, in a case where said electrical regenerative relay of said wavelength path at a node of interest is determined to be required on the basis of a result of cumulative determination made by said end-point node, effectively controls said electrical regenerative relay of said wavelength path to be performed by said electrical regenerative relay control section, by means of settings effected by said end-point node.

14. The optical transmission node for implementing path optimization according to claim 11, further comprising:
   an other-node wavelength conversion setting section which sets wavelength conversion of said wavelength path with regard to another add-drop node which requires wavelength conversion of said wavelength path on the basis of an arrangement of wavelengths determined by said wavelength arrangement determination section.

15. The optical transmission node for implementing path optimization according to claim 11, further comprising:
   a wavelength conversion function section selectively subjecting at least one of the one or more wavelengths forming said wavelength multiplexed optical signal to wavelength conversion; and
   a node-of-interest wavelength conversion control section which effectively controls wavelength conversion of said wavelength path to be performed by said wavelength conversion function section in accordance with wavelength conversion settings output from said end-point node based on an arrangement of wavelength with regard to an optimal path determined at said end-point node.

16. The optical transmission node for implementing path optimization according to claim 9, further comprising:
   a dispersion measurement section for measuring a dispersion value and a dispersion slope with regard to said optimal pathway of said wavelength path; and
   an other-node dispersion compensation setting section which effects required dispersion compensation settings, on the basis of a result of measurement performed by said dispersion measurement section, in a dispersion compensation function section of another add-drop node provided in said optimal pathway.

17. The optical transmission node for implementing path optimization according to claim 9, further comprising:
   a dispersion compensation function section capable of compensating for wavelength compensation of said wavelength multiplexed optical signal on a per-wavelength basis; and
   a dispersion compensation control section for controlling dispersion compensation of a node of interest to be performed by said dispersion compensation function section according to a dispersion value pertaining to said optimal pathway achieved in said end-point node and dispersion compensation settings sent from said end-point node on the basis of a result of measurement of said dispersion slope.

* * * * *

UNITED STATES PATENT AND TRADEMARK OFFICE
CERTIFICATE OF CORRECTION

PATENT NO. : 7,454,138 B2
APPLICATION NO. : 11/282066
DATED : November 18, 2008
INVENTOR(S) : Yasuko Nozu Page 1 of 1

It is certified that error appears in the above-identified patent and that said Letters Patent is hereby corrected as shown below:

Title page, please add

--Related U.S. Application Data

Continuation of application No. PCT/JP03/12398 filed on Sep. 29, 2003.--

Signed and Sealed this
Eleventh Day of September, 2012

David J. Kappos
*Director of the United States Patent and Trademark Office*